(12) United States Patent
Vainio et al.

(10) Patent No.: US 6,493,938 B1
(45) Date of Patent: Dec. 17, 2002

(54) THERMOPLASTIC-COATED ROLL, METHOD FOR MANUFACTURE AND CALENDERING OF THE THERMOPLASTIC-COATED ROLL FOR USE IN PAPER/BOARD MACHINES

(75) Inventors: Tommi Vainio, Vantaa (FI); Juha Koriseva, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/424,635

(22) PCT Filed: May 26, 1998

(86) PCT No.: PCT/FI98/00438

§ 371 (c)(1),
(2), (4) Date: Feb. 15, 2000

(87) PCT Pub. No.: WO98/54405

PCT Pub. Date: Dec. 3, 1998

(30) Foreign Application Priority Data

May 30, 1997 (FI) .................................................. 972301

(51) Int. Cl.[7] ............................................. B21D 53/00
(52) U.S. Cl. ................................. 29/895.211; 492/50
(58) Field of Search .......................... 492/49, 50, 51, 492/52, 56; 29/895, 895.21, 895.211; 156/172, 187, 190, 195; 264/166, 171.14, 313

(56) References Cited

U.S. PATENT DOCUMENTS

| | | | | |
|---|---|---|---|---|
| 3,490,119 A | * | 1/1970 | Fukuyama et al. | 492/52 |
| 3,663,330 A | * | 5/1972 | Sager | 156/190 |
| 3,707,752 A | | 1/1973 | Brafford et al. | 29/132 |
| 3,737,963 A | * | 6/1973 | Postukla et al. | 492/50 |
| 3,800,381 A | | 4/1974 | Brafford | 29/132 |
| 4,324,177 A | | 4/1982 | Tsuji et al. | 100/155 R |
| 4,368,568 A | | 1/1983 | Watanabe | 29/130 |
| 5,023,985 A | * | 6/1991 | Salo et al. | 492/53 |
| 5,387,172 A | * | 2/1995 | Habenicht et al. | 492/50 |
| 5,572,790 A | * | 11/1996 | Sekar | 29/895.211 |
| 5,655,196 A | * | 8/1997 | Litman et al. | 492/25 |
| 5,669,941 A | * | 9/1997 | Peterson | 51/295 |
| 5,745,816 A | * | 4/1998 | Verlinden et al. | 492/50 |
| 5,766,753 A | * | 6/1998 | Murata et al. | 492/53 |
| 5,780,131 A | * | 7/1998 | Paasonen et al. | 428/35.9 |
| 5,782,730 A | * | 7/1998 | Kawasaki et al. | 492/56 |
| 5,978,639 A | * | 11/1999 | Masuda et al. | 399/302 |
| 5,993,366 A | * | 11/1999 | Kaji et al. | 492/56 |
| 6,077,207 A | * | 6/2000 | Yokoyama et al. | 492/30 |
| 6,096,395 A | * | 8/2000 | Hayashi et al. | 428/35.9 |
| 6,122,479 A | * | 9/2000 | Fujita et al. | 399/333 |
| 6,206,994 B1 | * | 3/2001 | Shieh et al. | 156/172 |
| 6,286,741 B1 | * | 9/2001 | Itoh | 226/186 |
| 6,338,706 B1 | * | 1/2002 | Sohl | 492/56 |
| 6,357,485 B2 | * | 3/2002 | Quigley et al. | 138/125 |

FOREIGN PATENT DOCUMENTS

| | | | |
|---|---|---|---|
| DE | 297 22 778 U1 | * 4/1998 | |
| EP | 0321561 | 5/1996 | ............ D21G/1/02 |
| GB | 1230265 | 4/1971 | ............ F16C/13/00 |
| JP | 39869 | 10/1972 | |
| JP | 19814 | 6/1973 | |
| JP | 159317 | 12/1980 | |
| JP | 30625 | 8/1981 | |
| JP | 11220 | 1/1984 | |
| JP | 1715933 | 7/1993 | |
| WO | 9409208 | 4/1994 | ............ D21F/3/08 |

OTHER PUBLICATIONS

Japanese Abstract of Appl. No. 54–65145 "Masking Roll and its Manufacture" (1 page).
Copy of PCT International Search Report (5 pages).

* cited by examiner

*Primary Examiner*—S. Thomas Hughes
*Assistant Examiner*—Marc Jimenez
(74) *Attorney, Agent, or Firm*—Steinberg & Raskin, P.C.

(57) ABSTRACT

The invention concerns a thermoplastic-coated roll for a paper/board machine, a method for manufacture of the roll, a composition of a thermoplastic coating for the roll, a method of calendering by using rolls in accordance with the invention, and paper/board manufactured by means of such rolls.

3 Claims, 3 Drawing Sheets

THERMOPLASTIC-COATED ROLL, METHOD FOR MANUFACTURE AND CALENDERING OF THE THERMOPLASTIC-COATED ROLL FOR USE IN PAPER/BOARD MACHINES

FIELD OF THE INVENTION

The present invention concerns a thermoplastic-coated roll for a paper/board machine, a method for manufacture of the roll, a composition of thermoplastic coating for the roll, a method of calendering by means of thermoplastic-coated rolls in accordance with the invention, and paper/board manufactured by means of such rolls.

BACKGROUND OF THE INVENTION

In a paper/board machine, currently polymer-coated rolls are employed in a number of applications. As examples of such rolls can be mentioned press rolls, suction rolls, soft rolls for a supercalender, and so-called soft-calender rolls. So far, the coatings have been mainly based on polymers and in particular on the use of thermosetting-plastic based resins, such as polyurethane or epoxy or unsaturated polyester. From the point of view of technology of manufacture, these polymers have been suitable for coating of large rolls; among other things, their casting in moulds or rotation casting is possible, even though problems of work hygiene have arisen from vapours of volatile organic compounds, such as styrene. Further manufacturing techniques that have been used include, among other things, extrusion, spraying, winding of fibre, winding of band, centrifugal casting, and use of various impregnated mats.

As an example of a thermosetting-resin coated roll should be mentioned the patent publication EP 321,561, in which a calender roll is described whose metal core has been coated with a resin layer consisting of a thermosetting plastic, such as polyurethane, polyisocyanurate, cross-linked polyesteramide, or epoxy resin.

The use of thermosetting plastic materials in demanding applications has, however, been limited, among other things, by their deficient properties of strength and toleration of heat as well as by an unfavourable viscoelastic conduct, i.e. by a phenomenon of hysteresis. If the temperature of a thermosetting plastic is raised to a level higher than its glass transition temperature Tg, its mechanical properties collapse. If there are so-called micro cracks in the coating, in a dynamic situation the edges of these cracks may be rubbed against each other so that locally the Tg of the coating material is exceeded and a macroscopic damage arises in the coating. With thermosetting plastics, no effect of strengthening/toughening occurs when the temperature is raised to or beyond the glass transition range, but the properties of strength of a thermosetting plastic collapse in the glass transition range. This property is an essential Imitation of the permitted running conditions of a roll. Out of these reasons, rolls coated with thermosetting plastics cannot be operated at a temperature higher than 200° C.

The need of polymer coatings for rolls which endure heat and have high strength has increased to a great extent in recent years. Owing to the limitations and difficulties related to thermosetting plastics, the possibility of finding new, alternative coatings among thermoplastic resins has also been examined, but a problem has been the lack of suitable materials and difficulties of manufacturing technology. Attempts have been made to solve these problems in the Finnish Patent Application No. 920501, in which a method has been suggested for coating a roll for a paper machine with a thermoplastic powder, together with a roll manufactured by means of the method. In such a case, the roll is coated by using a hypersonic plasma and a granular polymer powder in order to obtain the desired coating layer. This method is, however, expensive, the coating does not include any reinforcement material.

Thus, there is still a need to find a solution by whose means it is possible to provide a thermoplastic-coated roll whose properties and range of operation are more satisfactory and which is reasonable in respect of the manufacturing technique.

OBJECTS AND SUMMARY OF THE INVENTION

The objectives of the invention are achieved and the drawbacks of the prior art are overcome by means of the solution in accordance with the present invention.

The subject of the present invention is a thermoplastic-based roll coating (Shore D 70 . . . 98) for highly demanding applications, such as, for example, for supercalenders and soft calenders, which applications are ever more demanding in respect of the linear load, running speed, and temperature and of combinations of same in an attempt to provide a better quality level of paper. Further, the invention concerns a method for manufacture of a thermoplastic-coated roll, a composition of thermoplastic coating, a method of calendering by means of thermoplastic-coated rolls, as well as paper/board manufactured by means of thermoplastic-coated rolls.

The thermoplastic-coated roll in accordance with the invention, the method for manufacture of the roll, the composition of thermoplastic coating, the method of calendering by means of thermoplastic-coated rolls in accordance with the invention, and the paper/board manufactured by means of such rolls are characterized in what is stated in the patent claims.

BRIEF DESCRIPTION OF THE DRAWINGS

The invention will be described in relation to the following illustrations.

List of illustrations.

DETAILED DESCRIPTION OF THE INVENTION

Figure 1:
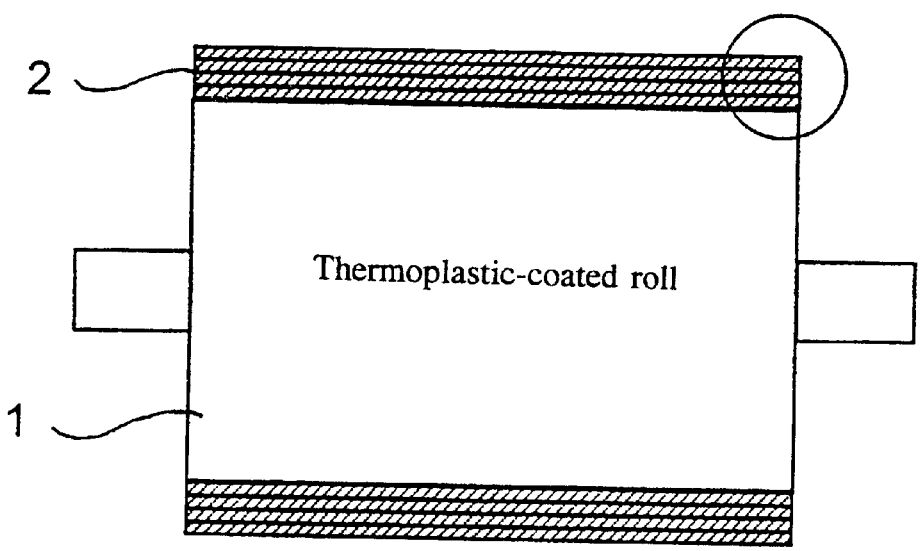
FIG. 1 illustrates a preferred coated roll in accordance with the invention.

FIG. 1 shows a coated roll in accordance with the invention, e.g. a calender, press or suction roll, onto whose body 1 a thermoplastic-based coating 2 has been applied.

Figure 2:
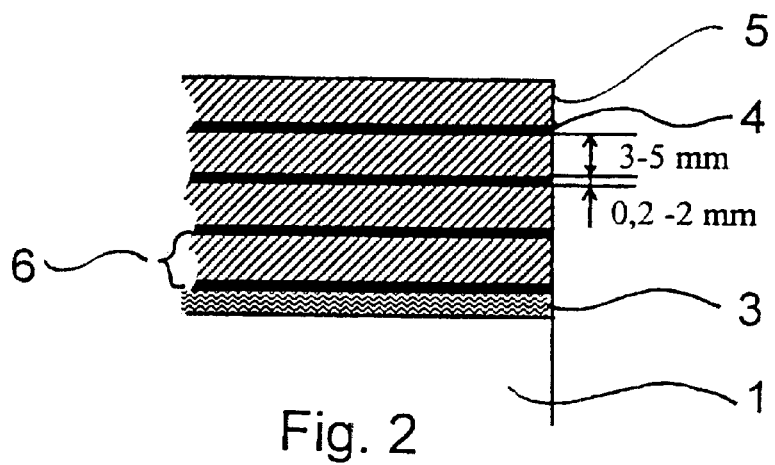
FIG. 2 is an enlarged illustration in part of the coating of the roll shown in FIG. 1.

FIG. 2 shows the coating 2 in more detail. Onto the roll body 1, a primer and adhesive layer 3 has been spread. On said layer, a reinforced thermoplastic coating is provided, which consists of a number of layers 6. In each layer 6, reinforced thermoplastic layers 4 alternate with thermoplastic layers 5 which have not been reinforced or which contain little reinforcing material. It should be noticed that, besides the so-called sandwich coating solution described above, the coating in accordance with the invention may also consist of reinforced thermoplastic layers 4 alone. In other words, the layer 5 is optional. Further, the layers 4 and 5 may contain filler material. The number of the layers 4 or 5 is preferably from two to about six. The thickness of the whole coating 2 is from about 10 mm to about 25 mm, from about 12 mm to about 18 mm; The thickness of a thermoplastic layer 5 is 3 . . . 5 mm.

Figure 3:
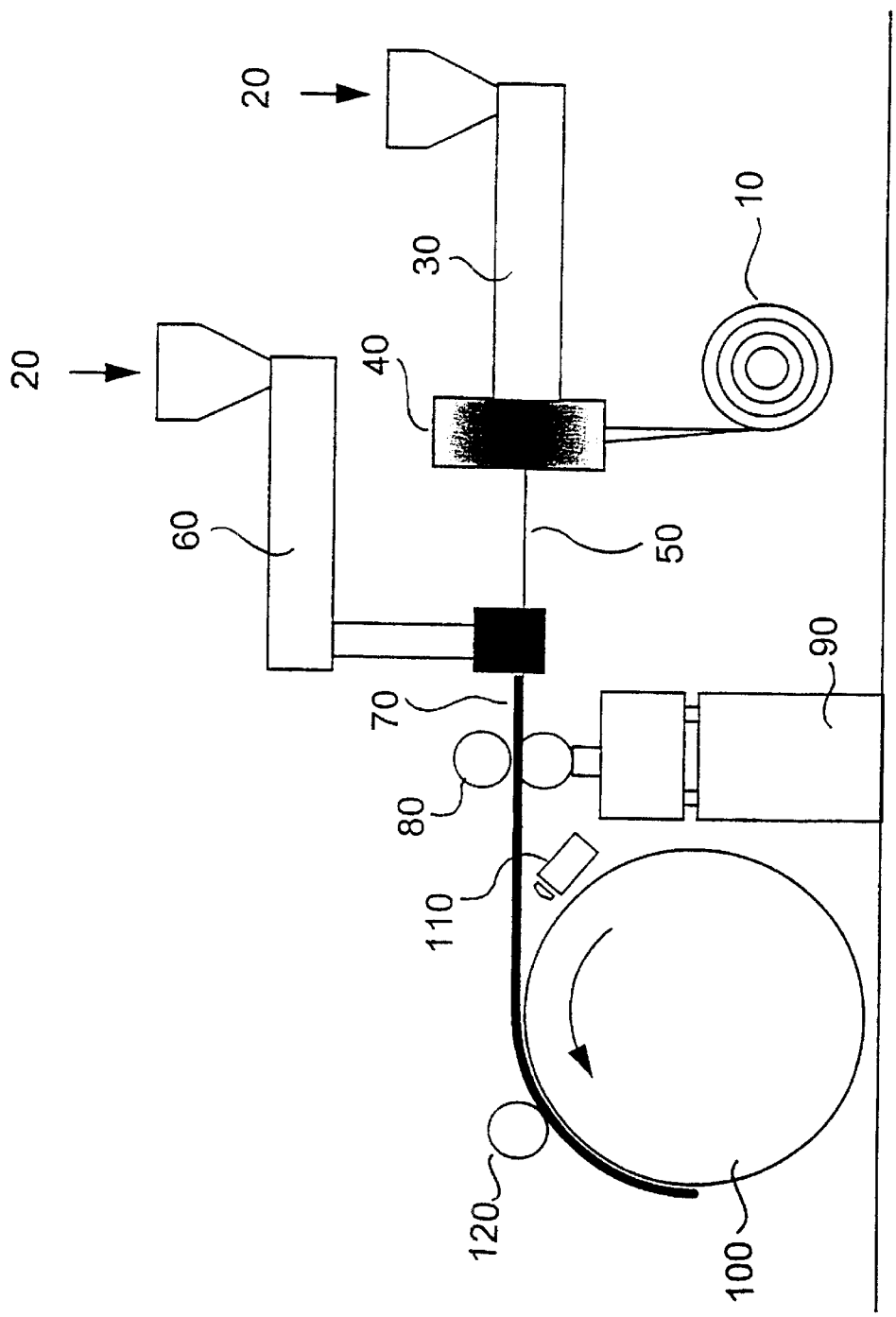
FIG. 3 illustrates the method of manufacture of a roll as shown in FIG. 2.

For example, by means of a method as illustrated in FIG. 3, it is possible to manufacture a reinforced thermoplastic coating in accordance with the invention. In the method, impregnation of thermoplastic resin in molten state into reinforcement fibre, coating with a layer of thermoplastic resin, and on-line winding of the band are combined. A continuous bundle of fibre or a narrow fibre mat 10 is impregnated with a suitable thermoplastic-matrix polymer 20 in the impregnation head 40 of an extruder 30 to the desired fibre content at a melt-processing temperature suitable for the polymer. The nozzle and the fibre mat are dimensioned so that the impregnated product that is discharged is a continuous band 50 of a width of from about 5 mm to about 60 mm, preferably and of a thickness of from about 0.2 mm to about 2 mm. The band 50 that was impregnated with a thermoplastic resin is coated with a thermoplastic resin, which is fed through an extruder 60. The band 70 thus obtained, which comprises a reinforced layer of thermoplastic resin and a non-reinforced layer of thermoplastic resin, is passed into a winding unit 80, which has been attached to a sledge 90 running at the side of the roll body. The roll body 100 to be coated has been pre-treated, for example, with a suitable primer and with a thin layer of thermoplastic resin in order to secure good adhesion between the coating and the metal body. While the roll body revolves, the winding head and the extruders are transferred by means of the sledge so that the band covers the whole roll body. It is an essential feature in this mode of manufacture that, right before the band is affixed to the roll face, the band is heated intensively so that the matrix polymer melts or is readily fluid/deformable. The heating can be carried out by using a suitable high-capacity source of heat 110 (e.g. flame, IR, hot-air blowing, laser). After the adhesion stage, the band is pressed with high force against the roll face, e.g., by means of a separate backup roll 120 in order to provide good adhesion and uniform surface quality. It is also essential that the tension of the band that is being wound is controlled in order that good adhesion could be achieved. The winding is carried out as a number of windings high enough so that the desired thickness of coating is reached. As a rule, a suitable thickness of coating is from about 10 mm to about 25 mm, but coatings of other thicknesses can also be manufactured depending on the application of use of the roll. The fibre content in the reinforcement band can be varied continuously by regulating the output of the extruder; when the output is increased, the fibre content is lowered, and the other way round. It is essential in a sandwich technique that the thickness of the band 70 that is wound is maintained as invariable as possible.

Figure 4:
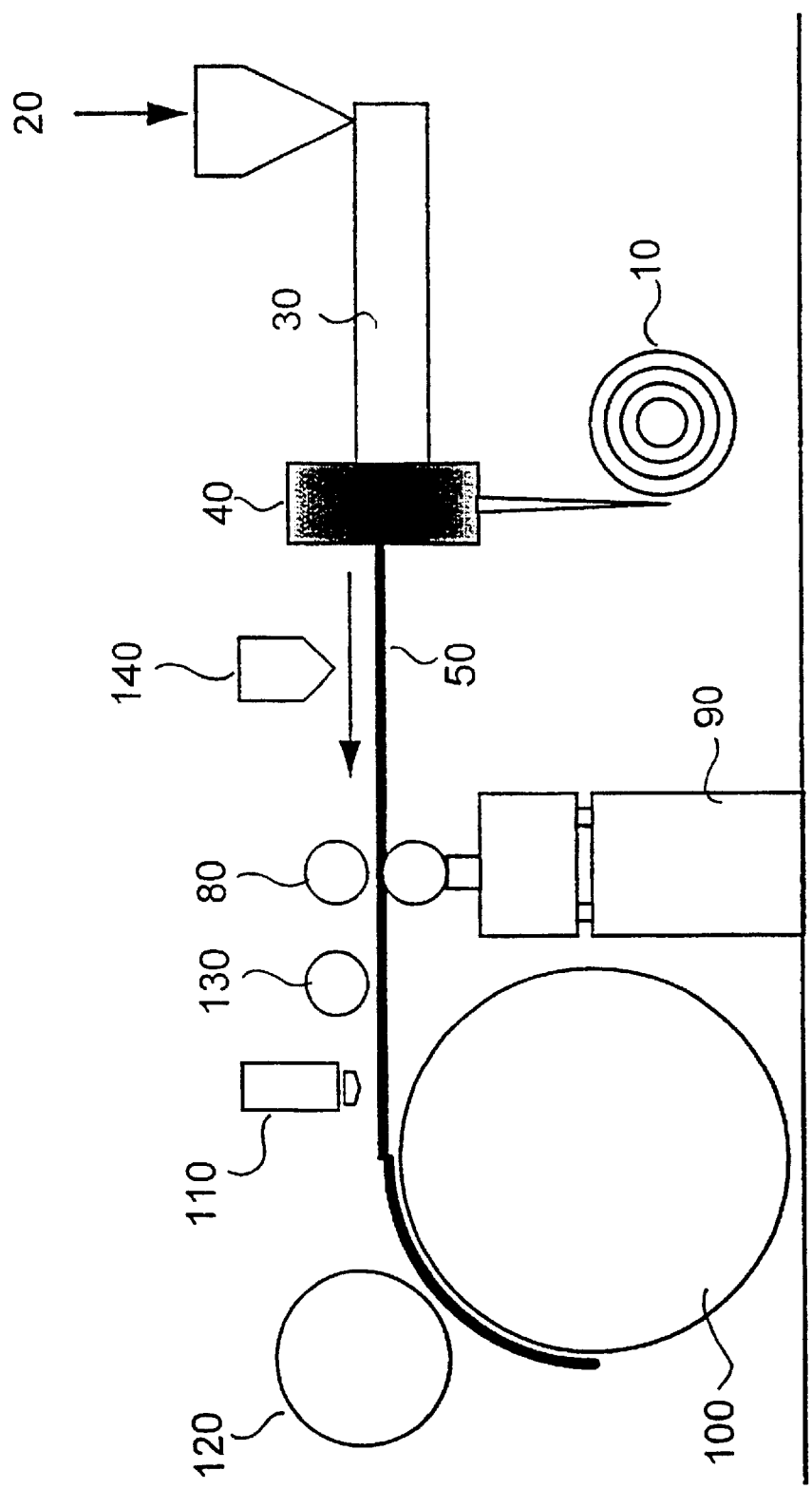
FIG. 4 shows a second embodiment of the invention.

FIG. 4 illustrates a method in accordance with the invention when a coating is manufactured which comprises reinforced layers of thermoplastic resin only. In such a case, one of the extruders 60 has been omitted. The numeral 130 represents an optional band tensioning roll, and the numeral 140 an optional air cooling equipment. Alternatively, the continuous fibre-reinforced polymer band can also be wound tightly around the roll body without using a source of heat. In such a case the ultimate coating is formed in a heat treatment oven, into which the roll is transferred after winding. The temperature in the oven must be maximally about from about 10 to about 20° C. higher than the melting/softening point of the polymer. The heat treatment must be sufficiently long in view of necessary melting together, but, however, as short as possible in order to avoid thermal decomposition of the polymer, which decomposition again deteriorates the properties of the polymer. The duration of the heat treatment is partly determined in accordance with the molten viscosity (zero-shear) of the polymer. In other words, the higher the viscosity, the longer is the time. It is important that the roll revolves during the whole duration of the heat treatment.

It is also possible to carry out the impregnation as a fully separate working step of its own, and the coating of the roll by winding is carried out as described above.

Thermoplastic resins have a glass transition temperature Tg of their own, but, unlike thermosetting resins, the toughness of partly crystalline thermoplastic resins increases after the glass transition temperature has been surpassed up to the point at which the melting point of the plastic is reached. This applies in particular when the degree of crystallinity is high. Fully amorphous thermoplastic resins are not suitable for use above the Tg. Polymer materials that are suitable for use in the invention include the following: out of partly crystalline polymers, advantageous are polyphenylene sulphide (PPS), polyether ketone (PEK), polyetherether ketone (PEEK), main-chain liquid-crystal polymer (LCP), thermoplastic polyester, polyphtalamide (PPA), polyamides (PA 46, PA 6 and PA 66), as well as thermoplastic resins that contain fluorine, and out of amorphous polymers, advantageous are polyetherimide (PEI), polyetherimide/polycarbonate (PEI/PC mixture), polyethersulphone (PES), and polysulphone (PSU). By means of mixing of different thermoplastic resins, it is possible to affect the Tg values of the coating materials. When polymer coatings of very high strength are prepared, it is preferable to minimize the proportion of amorphous materials. The crystallinity of a polymer can be increased by means of slow cooling and heat treatment. Preferably, the thermoplastic resin that is used with a reinforcement fibre and in the thick layer of thermoplastic resin is the same.

A fibre reinforcement layer provides the coating with the desired modulus of elasticity. As the fibre material, it is possible to use glass, carbon or ceramide fibres, and the width of the impregnation band is preferably from about 5 mm to about 60 mm. The impregnation, which is carried out by means of a technique in itself known was difficult in the prior art, because thermosetting plastics are readily fluid and do not adhere to a fibre very well, whereas thermoplastic resins are highly viscous, in which case the fibres have not become moist.

The reinforcement and/or filler material/materials that may be used in a layer of thermoplastic resin can be a known inorganic filler material, such as talc, kaolin, mica, silicates, ceramic materials ($Cr_2O_3$, $TiO_2$, $AlO_2$ . . . ), chalk, glass flakes, glass globules, carbon black, and broken-fibre reinforcement.

In the mode in accordance with the invention, an excellently tough coating is obtained, which has a good toleration of high temperature. Further, in this method, no volatile compounds are used at all, in which case the problems in respect of work hygiene are avoided. Further, since an on-line process is concerned, it is not necessary to keep the products in intermediate storage.

Thermoplastic-coated rolls can be used as rolls for calenders, supercalenders and soft calenders, but also in the press section, for example as suction rolls or grooved rolls, on which particular requirements are imposed in respect of the strength of the roll face, because the rolls must additionally endure the strain produced by the fibres.

When a coated roll in accordance with the invention is used in calender or press applications, it is preferable to attempt to optimize the operating temperature so that the temperature of the coating is above the Tg temperature of the thermoplastic matrix. Above the Tg value, the thermoplastic matrix becomes considerably tougher, whereas in the range of Tg transition the modulus of elasticity of thermoplastic resins is lowered steeply with an increase in the temperature, for which reason, in the vicinity of Tg, the conditions in the nip are uncontrolled.

Operation above the Tg temperature can be accomplished by heating the roll body or by lowering the glass transition temperature of the plastic matrix. The roll body can be heated so that the temperature of the coating is always above Tg. In such a case, the desired toughening and strengthening of the coating takes place. The heating can take place by means methods known from the prior art, by means of a heatable medium, such as water, steam, oil, etc. Other suitable methods of heating are, for example, the induction, IR-radiation, and hot-air methods. In such a case it is essential that under process conditions the operation takes place substantially at a temperature at which the modulus of elasticity of the coating material is almost invariable. The level of the modulus of elasticity above Tg is regulated by varying the quantity of reinforcement or filler materials. In this connection, it is also necessary to ensure that the internal generation of heat in the coating material, i.e. the loss factor, is as low as possible. It is also possible to use a non-heated polymer roll, in which case the level of the modulus of elasticity is higher and the coating is, in a corresponding way, harder. By means of suitable mixing of different thermoplastic resins with one another, the glass transition temperature of the coating material can be lowered so that the process temperature is higher than the glass transition temperature of the coating material without heating of the thermoplastic-coated roll. In such a case, the desired toughening of the material is achieved without using a heated roll. In calender applications, a metal-faced roll should, however, as a rule, also be heated in such a case.

Roll coatings of thermoplastic resin in accordance with the invention have excellent toughness compared with roll coatings based on thermosetting plastics. Rolls with thermoplastic coatings can be used in a temperature range of from about 10 to about 270° C. Thus, calendering can be carried out at considerably higher temperatures than with thermoset-coated rolls, up to a temperature of 270° C., in which case the product that is obtained is a paper/board of highly uniform and excellent quality.

What is claimed is:

1. A method for manufacturing a roll for a paper/board machine, comprising:

applying onto a roll body, a coating which comprises at least one layer of continuous fibers impregnated with thermoplastic resin and at least one layer of thermoplastic resin which has not been reinforced;

impregnating a continuous bundle of fiber or a narrow fiber mat (10) with a suitable thermoplastic-matrix polymer (20) in an impregnation head (40) of a first extruder (30) to a desired fiber content at a melt-processing temperature suitable for said polymer, cooling an impregnated band (50) that is discharged from the first extruder and passing said impregnated band to a nozzle for addition of a thermoplastic resin layer at a second extruder (60) where said band is coated with a thermoplastic resin and from the first extruder, passing the band onto a winding unit (80), wherein said winding unit is attached to a sledge (90) running at a side of the roll body, transferring a winding head with said sledge while the roll body (100) revolves so that the whole roll body is covered by the band that has been impregnated and coated;

and right before the band is affixed to a roll face, heating said band is and after an adhesion stage, pressing the band with high force against the roll face.

2. A method as in claim 1, wherein the thermoplastic resin is selected from the group consisting of polyphenylen sulphide, polyether ketone, polyehter-ether ketone, main-chain liquid-crystal polymer, polyphtalamide, polyamide, thermoplastic resin that contains fluorine, polyetherimide, polyetherimide/polycarbonate mixture, polyethersulphone, thermoplastic polyester, polysulphone, and a mixture thereof.

3. A method as in claim 1, wherein the thermoplastic resin contains filler material/materials, said filler material/materials selected from the group consisting of kaolin, mica, silicate, talc, chalk, glass globules, glass flakes, ceramic material, carbon black and broken-fibre reinforcement.

\* \* \* \* \*